(12) United States Patent
Niwa et al.

(10) Patent No.: US 8,597,786 B2
(45) Date of Patent: Dec. 3, 2013

(54) PRESSURE-SENSITIVE ADHESIVE COMPOSITION, PRESSURE-SENSITIVE ADHESIVE SHEET, AND METHOD FOR PRODUCING THE SAME

(75) Inventors: Masahito Niwa, Osaka (JP); Masayuki Okamoto, Osaka (JP); Naoaki Higuchi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 783 days.

(21) Appl. No.: 12/470,048

(22) Filed: May 21, 2009

(65) Prior Publication Data

US 2009/0291227 A1 Nov. 26, 2009

(30) Foreign Application Priority Data

May 23, 2008 (JP) ............................ P.2008-135518
Jul. 31, 2008 (JP) ............................ P.2008-198269

(51) Int. Cl.
- B32B 7/14 (2006.01)
- B32B 15/082 (2006.01)
- C08J 3/28 (2006.01)
- C08F 2/46 (2006.01)

(52) U.S. Cl.
USPC .......... 428/355 AC; 428/355 CN; 428/355 R; 522/150; 522/152; 522/153; 522/175; 522/173; 522/182; 526/256; 526/259; 526/261; 526/263; 526/264; 427/508; 427/516

(58) Field of Classification Search
USPC ............... 522/150, 152, 153, 175, 173, 182; 428/355 CN, 355 AC; 526/258, 259, 526/261, 263, 264; 427/508, 516
See application file for complete search history.

(56) References Cited

U.S. PATENT DOCUMENTS

| | | |
|---|---|---|
| 3,728,148 A | 4/1973 | Pietsch et al. |
| 4,364,972 A | 12/1982 | Moon |
| 2003/0017331 A1 | 1/2003 | Okochi et al. |
| 2009/0104445 A1 | 4/2009 | Inoue et al. |
| 2010/0215947 A1* | 8/2010 | Yamanaka et al. ............ 428/323 |

FOREIGN PATENT DOCUMENTS

| | | |
|---|---|---|
| CN | 1388199 A | 1/2003 |
| JP | 48-17741 A | 5/1973 |
| JP | 58-500130 A | 1/1983 |
| JP | 10-306267 A | 11/1998 |
| JP | 2000-303045 A | 10/2000 |
| JP | 2003-165965 A | 6/2003 |
| JP | 2005-325250 A | 11/2005 |
| JP | 2007-063536 A | 3/2007 |
| JP | 2007-264092 A | 10/2007 |
| JP | 2008-024818 A | 2/2008 |
| JP | 2009-120807 A | 6/2009 |
| WO | 2007111138 A1 | 10/2007 |
| WO | WO 2009054106 A1 * | 4/2009 |

OTHER PUBLICATIONS

Office Action issued on Mar. 15, 2012 in the corresponding Chinese patent application 200910202956.9.
Office Action dated Nov. 1, 2012 issued by the Japanese Patent Office in counterpart Japanese Application No. 2008-198269.
Office Action dated Sep. 13, 2012, issued by the State Intellectual Property Office of P.R. China in counterpart Chinese Application No. 200910202956.9.
Office Action dated Dec. 28, 2012 issued by the State Intellectual Property Office of P.R. China in counterpart Chinese Patent Application No. 200910202956.9.

* cited by examiner

*Primary Examiner* — Sanza McClendon
(74) *Attorney, Agent, or Firm* — Sughrue Mion, PLLC

(57) ABSTRACT

The present invention relates to a pressure-sensitive adhesive composition including, as a main ingredient, a monomer mixture or an acrylic copolymer material obtained by at least partially polymerizing the monomer mixture, the monomer mixture including: at least one monomer (monomer m1) selected from alkyl (meth)acrylates represented by the following formula (I) $CH_2=C(R^1)COOR^2$ in which $R^1$ is a hydrogen atom or a methyl group, and $R^2$ is an alkyl group having 1 to 20 carbon atoms: at least one monomer (monomer m2) selected from N-hydroxyalkyl(meth)acrylamides represented by the following formula (II) $CH_2=C(R^1)CONHR^4$ in which $R^3$ is a hydrogen atom or a methyl group, and $R^4$ is a hydroxyalkyl group having 2 to 4 carbon atoms: and at least one monomer (monomer m3) selected from N-vinyl cyclic amides and (meth)acrylamides that may have an N-alkyl group; and the monomer mixture including substantially no carboxyl group-containing monomer.

6 Claims, 2 Drawing Sheets

PRESSURE-SENSITIVE ADHESIVE COMPOSITION, PRESSURE-SENSITIVE ADHESIVE SHEET, AND METHOD FOR PRODUCING THE SAME

FIELD OF THE INVENTION

The present invention relates to a pressure-sensitive adhesive (hereinafter also referred to as adhesive, and the same shall apply hereinafter) composition and a pressure-sensitive adhesive sheet, and specifically, it relates to a pressure-sensitive adhesive sheet suitable for the applications for directly attaching to a metal surface or for other various applications, and relates to a pressure-sensitive adhesive composition for the pressure-sensitive adhesive sheet. The present invention further relates to a method for producing the pressure-sensitive adhesive sheet.

BACKGROUND OF THE INVENTION

Recently, the pressure-sensitive adhesive sheets have been employed in various aspects such as fixation (bonding), conveyance, protection, decoration, and the like of articles. Typical examples of the pressure-sensitive adhesive sheets include those provided with a pressure-sensitive adhesive layer formed by using an acrylic adhesive composition. This acrylic adhesive composition is configured such that it may form a pressure-sensitive adhesive layer containing an acrylic copolymer as a base polymer. As the acrylic copolymer, those containing alkyl (meth)acrylate as a main ingredient (a main component) and further containing a copolymerization composition containing a carboxyl group-containing monomers such as acrylic acid, for the purpose of improving adhesive performance, and the like are generally used.

However, for a pressure-sensitive adhesive sheet used for the articles having a part composed of a material that is susceptible to an acid (for example, an article having a metal surface, such as electronic parts), when it has the copolymerization composition containing a carboxyl group-containing monomer as described above, the carboxyl group in the acrylic copolymer may be responsible for the unfavorable effects on the above-described material (for example, the corrosion of the metal surface). Accordingly, the pressure-sensitive adhesive composition for forming a pressure-sensitive adhesive layer provided in a pressure-sensitive adhesive sheet for these applications (particularly, an application for directly attaching to a metal surface) is preferably in a constitution enabling the formation of a pressure-sensitive adhesive layer having, as a base polymer, an acrylic copolymer having a copolymerization composition containing no carboxyl group-containing monomer. As the background art documents regarding these kinds of technologies, JP-A-2007-63536, JP-A-2005-325250 and JP-A-2007-264092 may be exemplified. As the background art documents regarding the acrylic adhesive, JP-A-2007-264092 may be exemplified. JP-A-2003-165965 is a background art document regarding a pressure-sensitive adhesive and an adhesive.

However, a pressure-sensitive adhesive composition containing no carboxyl group-containing monomer tends to have insufficient adhesion characteristics of a pressure-sensitive adhesive sheet formed from the composition. Regarding this, JP-A-2007-63536 describes copolymerization with a specific maleimide-based compound, JP-A-2005-325250 describes copolymerization with a nitrogen atom-containing monomers such as N-acryloylmorpholine, and JP-A-2000-303045 describes use of specific monomers such as phenoxyethyl acrylate, as main monomer components. However, even in the pressure-sensitive adhesive sheets formed by using these technologies, there is room for improvement in adhesive performance. For example, it would be useful to provide a pressure-sensitive adhesive composition that exhibits a desired cohesive force without the use of a carboxyl group-containing monomer, and further is capable of forming a pressure-sensitive adhesive sheet having increased repelling resistance (adhesiveness on a curved surface).

SUMMARY OF THE INVENTION

The present invention has been made in light of the conventional circumstances, and an object of the invention is to provide an acrylic adhesive composition that enables formation of a pressure-sensitive adhesive sheet having improved adhesive performances (particularly repelling resistance), without the substantial use of a carboxyl group-containing monomer. Another object of the present invention is to provide a pressure-sensitive adhesive sheet using the pressure-sensitive adhesive composition. A further object of the present invention is to provide a method for producing the pressure-sensitive adhesive sheet.

Namely, the present invention relates to the following items (1) to (8).

(1) A pressure-sensitive adhesive composition including, as a main ingredient, a monomer mixture or an acrylic copolymer material obtained by at least partially polymerizing the monomer mixture, the monomer mixture including:

at least one monomer (monomer m1) selected from alkyl (meth)acrylates represented by the following formula (I) in an amount of 50 to 85% by weight based on a total amount of the monomer mixture:

in which $R^1$ is a hydrogen atom or a methyl group, and $R^2$ is an alkyl group having 1 to 20 carbon atoms, at least one monomer (monomer m2) selected from N-hydroxyalkyl(meth)acrylamides represented by the following formula (II) in an amount of 0.1 to 12% by weight based on the total amount of the monomer mixture:

in which $R^3$ is a hydrogen atom or a methyl group, and $R^4$ is a hydroxyalkyl group having 2 to 4 carbon atoms, and at least one monomer (monomer m3) selected from N-vinyl cyclic amides and (meth)acrylamides that may have an N-alkyl group, in an amount of 10 to 40% by weight based on the total amount of the monomer mixture; and the monomer mixture including substantially no carboxyl group-containing monomer.

(2) The composition according to (1), in which the monomer m1, the monomer m2 and the monomer m3 are contained in a total amount of 90% by weight or more based on the total amount of the monomer mixture.

(3) The composition according to (1) or (2), in which the monomer mixture has such a monomer composition that the acrylic copolymer, obtained by polymerizing the monomer mixture, has a glass transition temperature (Tg) of −10° C. or lower.

(4) The composition according to any one of (1) to (3), in which the monomer m2 is N-(2-hydroxyethyl)(meth)acrylamide.

(5) The composition according to any one of (1) to (4), in which the monomer m3 is at least one monomer selected from N-vinyl cyclic amides represented by the following formula (III):

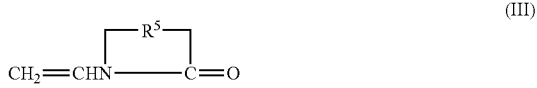

in which $R^5$ is a divalent organic group.

(6) The composition according to any one of (1) to (5), which is used for a pressure-sensitive adhesive sheet to be directly attached to a metal surface.

(7) A pressure-sensitive adhesive sheet including a pressure-sensitive adhesive layer formed by using the composition according to any one of (1) to (6).

(8) A method for producing a pressure-sensitive adhesive sheet, the method including:

preparing a pressure-sensitive adhesive composition including a monomer mixture or an acrylic copolymer material obtained by partially polymerizing the monomer mixture, and 0.01 to 2 parts by weight of a photopolymerization initiator based on 100 parts by weight of the monomer mixture, the monomer mixture including:

at least one monomer (monomer m1) selected from alkyl (meth)acrylates represented by the following formula (I) in an amount of 50 to 85% by weight based on the total amount of the monomer mixture:

$$CH_2=C(R^1)COOR^2 \quad (I)$$

in which $R^1$ is a hydrogen atom or a methyl group, and $R^2$ is an alkyl group having 1 to 20 carbon atoms, at least one monomer (monomer m2) selected from N-hydroxyalkyl(meth)acrylamides represented by the following formula (II) in an amount of 0.1 to 12% by weight based on the total amount of the monomer mixture:

$$CH_2=C(R^3)CONHR^4 \quad (II)$$

in which $R^3$ is a hydrogen atom or a methyl group, and $R^4$ is a hydroxyalkyl group having 2 to 4 carbon atoms, and at least one monomer (monomer m3) selected from N-vinyl cyclic amides and (meth)acrylamides that may have an N-alkyl group, in an amount of 10 to 40% by weight based on the total amount of the monomer mixture, and the monomer mixture including substantially no carboxyl group-containing monomer;

applying the pressure-sensitive adhesive composition to a support; and curing the applied composition by irradiating the applied composition with light to thereby form a pressure-sensitive adhesive layer.

The "acrylic copolymer material" may be a partially polymerized product of the monomer mixture, or an acrylic copolymer obtained by polymerization of approximately all of the monomer mixture (for example, at a conversion of about 95% or more, preferably about 99% or more). The partially polymerized product of the monomer mixture can typically include a polymer obtained by polymerizing a partial proportion of monomers constituting the monomer mixture (it may include a monomer having a relatively low polymerization degree, and for example, it may include a polymer having a weight average molecular weight of usually no more than $1\times10^4$ (which may also be referred to as oligomer)), and unpolymerized monomers. A conversion of the partially polymerized product (that is, a ratio of the monomers that have been polymerized in advance in the used monomers) may be, for example, about 2 to 50%. Further, the expression as disclosed herein that the pressure-sensitive adhesive composition include, as main ingredients, the monomer mixture or the acrylic copolymer material, means that the acrylic copolymer obtained by polymerizing the monomer mixture (which may be a polymer obtained by the polymerization or the curing of the monomer mixture or a partially polymerized product thereof by irradiating light, or the like, or substantially the acrylic copolymer material per se) constitutes, as a base polymer (a main component in the polymer component), a pressure-sensitive adhesive formed with the pressure-sensitive adhesive composition.

Since the pressure-sensitive adhesive composition contains, as main ingredients, the monomer mixture or an acrylic copolymer material that does not substantially employ a monomer containing a carboxyl group (a carboxyl group-containing monomer), even when a pressure-sensitive adhesive layer formed by using the composition is directly attached on a surface composed of a material that is susceptible to an acid, such as a metal surface, the corrosion of the metal surface, and the like by the carboxyl group can be prevented. In addition, by using, as main ingredients, an acrylic copolymer having a monomer composition (a proportional ratio of each of the monomers used as a monomer component) including the monomer m1 as a main component together with predetermined amounts of the monomer m2 and the monomer m3, a pressure-sensitive adhesive layer (or consequently, a pressure-sensitive adhesive sheet including the pressure-sensitive adhesive layer, and this shall apply hereinafter) having a high cohesive force, and exhibiting further improved repelling resistance can be formed.

As a preferred example of the monomer m2, N-(2-hydroxyethyl)(meth)acrylamides can be mentioned. Among these, N-(2-hydroxyethyl)acrylamide is preferably used. Further, as the monomer m3, at least one monomer selected from N-vinyl cyclic amides represented by the following formula (III) can be preferably used:

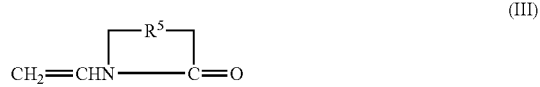

in which $R^5$ is a divalent organic group.

As a preferred example of the N-vinyl cyclic amide, N-vinyl-2-pyrrolidone (i.e., a compound in which $R^5$ in the formula (III) is a propylene group) can be mentioned.

In a preferred embodiment of the pressure-sensitive adhesive composition as disclosed here, the total amount of the monomers m1, m2 and m3 is about 90% by weight or more based on the total amount of monomer mixture. The pressure-sensitive adhesive composition contains, as main ingredients, the monomer mixture of such a composition or an acrylic copolymer material can form a pressure-sensitive adhesive layer having more excellent quality stability.

The monomer mixture preferably has such a monomer composition that the acrylic copolymer obtained by polymerizing the monomer mixture (that is, a base polymer in a pressure-sensitive adhesive formed with the pressure-sensitive adhesive composition) has a glass transition temperature (Tg) of about −10° C. or lower (typically about −10 to −70° C.). This adhesive composition can form a pressure-sensitive adhesive layer exhibiting good adhesive performances (tackiness, and the like), for example, at a normal temperature (typically around 5 to 35° C., for example, 20 to 25° C.).

In another preferred embodiment of the pressure-sensitive adhesive composition as disclosed herein, the composition contains a photopolymerization initiator, and is composed of a pressure-sensitive adhesive composition that is curable by irradiation of light (for example, an ultraviolet ray) (a photocurable pressure-sensitive adhesive composition). For example, it may be a pressure-sensitive adhesive composition formed by using about 0.01 to 2 parts by weight of a photopolymerization initiator, based on 100 parts by weight of the monomer mixture. A pressure-sensitive adhesive layer formed by irradiation of light onto this photocurable pressure-sensitive adhesive composition (which may be referred to as a photopolymerizable pressure-sensitive adhesive composition, or the like) may exhibit better adhesive performances (for example, a cohesive force, repelling resistance, and the like).

According to the present invention, a pressure-sensitive adhesive sheet which includes a pressure-sensitive adhesive layer containing, as a base polymer, an acrylic copolymer obtained by polymerizing any one of the monomer mixture as disclosed herein is provided. The pressure-sensitive adhesive layer can be a pressure-sensitive adhesive layer formed by using any one of the pressure-sensitive adhesive compositions as disclosed herein. That is, according to the present invention, a pressure-sensitive adhesive sheet including a pressure-sensitive adhesive layer formed by using any one of the pressure-sensitive adhesive compositions as disclosed herein is provided. Since this pressure-sensitive adhesive sheet contains, as a base polymer, a polymer derived from the monomer mixture or an acrylic copolymer material, even when it is directly attached on a surface composed of a material that is susceptible to an acid, such as a metal surface, there is no corrosion of the metal surface, and the like. Accordingly, it is suitable as a pressure-sensitive adhesive sheet used for directly attaching to a metal surface (a pressure-sensitive adhesive sheet to be attached to a metal surface). Further, the pressure-sensitive adhesive sheet can exhibit good adhesiveness on an object to be adhered other than the metal surface, as well as excellent cohesive force and repelling resistance. Moreover, any one of the pressure-sensitive adhesive compositions as disclosed herein is suitable as a pressure-sensitive adhesive composition used for forming a pressure-sensitive adhesive layer of a pressure-sensitive adhesive sheet to be attached to a metal surface.

According to the present invention, a method for producing a pressure-sensitive adhesive sheet on a metal surface (which can be a pressure-sensitive adhesive sheet to be attached to a metal surface) is also provided. The method includes a step of preparing a pressure-sensitive adhesive composition including the monomer mixture satisfying all of the following conditions (a) to (d), or an acrylic copolymer material obtained by partial polymerization of the monomer mixture. In a preferred embodiment, in this step, a photopolymerization initiator is used in an amount of about 0.01 to 2 parts by weight based on 100 parts by weight of the monomer mixture.

(a) The monomer mixture contains at least one monomer (monomer m1) selected from alkyl (meth)acrylates represented by the following formula (I). The content of the monomer m1 may be from 50 to 85% by weight based on the total amount of monomer mixture:

$$CH_2=C(R^1)COOR^2 \quad (I)$$

in which $R^1$ is a hydrogen atom or a methyl group, and $R^2$ is an alkyl group having 1 to 20 carbon atoms.

(b) The monomer mixture contains at lease one monomer (monomer m2) selected from N-hydroxyalkyl(meth)acrylamides represented by the following formula (II). The content of the monomer m2 may be from 0.1 to 12% by weight based on the total amount of monomer mixture:

$$CH_2=C(R^3)CONHR^4 \quad (II)$$

in which $R^3$ is a hydrogen atom or a methyl group, and $R^4$ is a hydroxyalkyl group having 2 to 4 carbon atoms.

(c) The monomer mixture contains at least one monomer (monomer m3) selected from N-vinyl cyclic amide and (meth)acrylamide that may have an N-alkyl group. The content of the monomer m3 may be from 10 to 40% by weight based on the total monomer mixture.

(d) The monomer mixture includes substantially no carboxyl group-containing monomer.

The method for producing the pressure-sensitive adhesive sheet further includes a step of applying the pressure-sensitive adhesive composition onto a support, and a step of curing the composition by irradiation of light onto the applied composition to thereby form a pressure-sensitive adhesive layer.

By this method, a pressure-sensitive adhesive sheet which can be preferably used even for a surface that is susceptible to an acid, such as a metal surface, and further has good adhesive performances (cohesive force, repelling resistance, and the like) can be efficiently prepared. Further, the method for producing the pressure-sensitive adhesive sheet in which a pressure-sensitive adhesive layer is formed by using the photocurable adhesive composition as described above is preferred in that it can easily form a thick adhesive layer.

DESCRIPTION OF REFERENCE NUMERALS AND SIGNS

Figure 1:
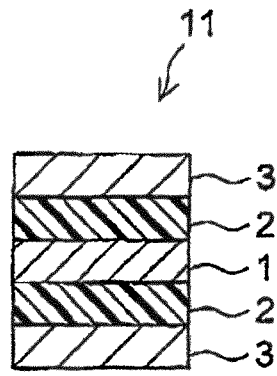
FIG. 1 is a schematic cross-sectional view showing a configuration example of the pressure-sensitive adhesive sheet according to the present invention.

1: Substrate
2: Pressure-sensitive adhesive layer
3: Release liner
11, 12, 13, 14, 15, and 16: Pressure-sensitive adhesive sheets

DETAILED DESCRIPTION OF THE INVENTION

Hereinbelow, suitable embodiments of the present invention will be described. Further, the factors required to carry out the present invention other than the factors specifically mentioned in the present specification can be figured out by the design of a skilled person in the art on the basis of a background art in the relevant field. The present invention can be carried out in accordance with a common technological knowledge in the relevant field and the contents disclosed in the present specification.

The pressure-sensitive adhesive composition as disclosed herein has, as main ingredients, predetermined monomer mixture, or an acrylic copolymer material obtained by partial polymerization of the monomer mixture. The monomer mixture includes at least the monomer m1, the monomer m2, and the monomer m3 as essential components.

The monomer m1 is a component which is a main monomer (main component) constituting the monomer mixture, and includes alkyl (meth)acrylate represented by the following formula (I), that is, (meth)acrylic ester of alkyl alcohol. Here, the "(meth)acrylic acid" is meant to encompass acrylic acid and methacrylic acid. Further, the expression that the monomer m1 is a main monomer means that the amount of the monomer m1 (in a case of including two or more alkyl (meth)acrylates represented by the formula (I), the total amount thereof) is 50% by weight or more based on the total amount of the monomer mixture.

The monomer m1 can be one or more selected from alkyl (meth)acrylates represented by the following formula (I).

$$CH_2=C(R^1)COOR^2 \quad (I)$$

Here, $R^1$ in the formula (I) is a hydrogen atom or a methyl group. Further, $R^2$ in the formula (I) is an alkyl group having 1 to 20 carbon atoms. The alkyl group may be linear or branched. Specific examples of alkyl (meth)acrylate represented by the formula (I) include methyl (meth)acrylate, ethyl (meth)acrylate, n-propyl (meth)acrylate, isobutyl (meth)acrylate, sec-butyl (meth)acrylate, t-butyl (meth)acrylate, pentyl (meth)acrylate, isopentyl (meth)acrylate, hexyl (meth)acrylate, heptyl (meth)acrylate, n-octyl (meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate and eicosyl (meth)acrylate. Among these, alkyl (meth)acrylate in which $R^2$ is an alkyl group having 2 to 14 carbon atoms (the range of carbon atoms may be hereinafter referred to "$C_{2-14}$") is preferable, and alkyl (meth)acrylate in which $R^2$ is a $C_{2-10}$ alkyl group (for example, an n-butyl group, a 2-ethylhexyl group, and the like) is more preferable.

In a preferred embodiment, the alkyl (meth)acrylate in which $R^2$ in the formula (1) is a $C_{2-10}$ (more preferably $C_{4-8}$) alkyl group occupies about 70% by weight or more (more preferably about 90% by weight or more) of the total amount of the monomer m1. Substantially all of the monomer m1 may be $C_{2-10}$ alkyl (more preferably $C_{4-8}$ alkyl) (meth)acrylate. The monomer mixture may be, for example, a composition including butyl acrylate (BA) alone, a composition including 2-ethylhexyl acrylate (2EHA) alone, a composition including the two kinds, that is, BA and 2EHA, as a monomer m1.

The amount of the monomer m1 can be about from 50 to 85% by weight (preferably 60 to 80% by weight) based on the total amount of the monomer mixture. When the amount of the monomer m1 is lower than the above-described range, the pressure-sensitive adhesive layer formed from the composition has a tendency of having insufficient adhesive performances (adhesiveness, tackiness, and the like). On the other hand, when the amount of the monomer m1 is higher than the above-described range, since the amount of the monomer m2 and the monomer m3 contained in the monomer mixture is decreased, the compatibility between the cohesive force (for example, durability against peeling under a certain stress, that is a static load characteristic) and the repelling resistance may be deteriorated. Further, it is usual that the composition of the monomer mixture (the monomer composition) corresponds to the copolymerization ratio of an acrylic copolymer obtained by polymerization of the monomer mixture (that is, a base polymer in a pressure-sensitive adhesive formed from the pressure-sensitive adhesive composition as disclosed herein).

The monomer mixture further includes the monomer m2, in addition to the monomer m1 as a main monomer. This monomer m2 may be one or more selected from N-hydroxyalkyl (meth)acrylamides represented by the following formula (II).

$$CH_2=C(R^3)CONHR^4 \quad (II)$$

Here, $R^3$ in the formula (II) is a hydrogen atom or a methyl group. Further, $R^4$ in the formula (II) is a hydroxyalkyl group having 2 to 4 carbon atoms. The alkyl group in the hydroxyalkyl group may be linear or branched. Specific examples of N-hydroxyalkyl(meth)acrylamide represented by the formula (II) include N-(2-hydroxyethyl)acrylamide, N-(2-hydroxyethyl)methacrylamide, N-(2-hydroxypropyl)acrylamide, N-(2-hydroxypropyl)methacrylamide, N-(1-hydroxypropyl)acrylamide, N-(1-hydroxypropyl)methacrylamide, N-(3-hydroxypropyl)acrylamide, N-(3-hydroxypropyl)methacrylamide, N-(2-hydroxybutyl)acrylamide, N-(2-hydroxybutyl)methacrylamide, N-(3-hydroxybutyl)acrylamide, N-(3-hydroxybutyl)methacrylamide, N-(4-hydroxybutyl)acrylamide and N-(4-hydroxybutyl)methacrylamide. Examples of the monomer m2 in the present invention, that is preferable from the viewpoint that a pressure-sensitive adhesive layer having good balance between hydrophilicity and hydrophobicity, and excellent balance among the pressure-sensitive adhesive properties can be formed, include N-(2-hydroxyethyl)acrylamide and N-(2-hydroxyethyl)methacrylamide. Particularly, N-(2-hydroxyethyl) acrylamide (HEAA) is preferably used. For example, 50% by weight or more (more preferably 70% by weight or more, typically substantially all) of the monomer m2 is preferably HEAA.

The monomer m2 can function as a component contributing to the improved aggregation of a pressure-sensitive adhesive due to the interaction between the molecules of the monomer m2. The amount of the monomer m2 may be about 0.1 to 12% by weight (typically about 1 to 10% by weight) based on the total amount of the monomer mixture. When the amount of the monomer m2 is lower than the above-described range, the pressure-sensitive adhesive layer formed from the composition has a tendency of having insufficient adhesive performances (adhesiveness at a high temperature, durability against peeling under a certain stress, and the like). On the other hand, when the amount of the monomer m2 is higher than the above-described range, there is a tendency that tackiness or the adhesiveness at a lower temperature is lowered.

In a preferred embodiment of the pressure-sensitive adhesive composition as disclosed herein, the amount of the monomer m2 is about 2% by weight or more (typically 2 to 12% by weight), and more preferably about 3% by weight or more (typically about 3 to 12% by weight, for example about 3 to 10% by weight) based on the total amount of the monomer mixture. By this adhesive composition, an effect that a pressure-sensitive adhesive sheet having better cohesive force and repelling resistance can be formed can be obtained.

The weight ratio of the monomer m1 and the monomer m2 in the monomer mixture (m1/m2) can be, for example, about 99/1 to 80/20. Usually, the weight ratio is preferably about 98/2 to 85/15 (more preferably about 97/3 to 90/10). By this adhesive composition, an effect that a pressure-sensitive adhesive sheet having better cohesive force and repelling resistance can be formed can be obtained. The total amount of the monomer m1 and the monomer m2 may be, for example, about 60 to 90% by weight based on the total amount of the monomer mixture. The total amount thereof is preferably about 70% by weight or more (for example, 70 to 90% by weight) based on the total amount of the monomer mixture.

The monomer mixture further includes a monomer m3, in addition to the monomers m1 and m2. This monomer m3 may be at least one monomer selected from the group consisting of N-vinyl cyclic amide; and (meth)acrylamide that may have an N-alkyl group. Specific examples of N-vinyl cyclic amide include N-vinyl-2-pyrrolidone, N-vinyl-2-piperidone, N-vinyl-3-morpholinone, N-vinyl-2-caprolactam, N-vinyl-1,3-oxadine-2-one and N-vinyl-3,5-morpholinedione. Specific examples of (meth)acrylamide that may have an N-alkyl group include (meth)acrylamides such as N-alkyl(meth)acrylamides; N-ethyl(meth)acrylamide, N-n-butyl(meth)acrylamide; and N,N-dialkyl(meth)acrylamides such as N,N-dimethyl(meth)acrylamide, N,N-diethyl(meth)acrylamide, N,N-dipropyl(meth)acrylamide, N,N-diisopropyl(meth)acrylamide, N,N-di(n-butyl)(meth)acrylamide, N,N-di(t-butyl)(meth)acrylamide. (Meth)acrylamide containing one or two N-alkyl groups having 1 to 4 carbon atoms (more preferably 1 or 2 carbon atoms) (for example, N,N-dialkylacrylamides such as N,N-diethylacrylamide, N,N-dimethylacrylamide) is preferably used.

As the monomer m3 in the technology as disclosed herein, N-vinyl cyclic amide represented by the following formula (III) can be preferably used:

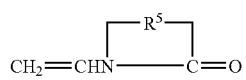

(III)

in which $R^5$ is a divalent organic group. $R^5$ in the above formula is preferably a saturated or unsaturated hydrocarbon group, more preferably a saturated hydrocarbon group (for example, an alkylene group having 3 to 5 carbon atoms). By the monomer mixture having such a composition, a pressure-sensitive adhesive composition for forming a pressure-sensitive adhesive layer having good balance among the adhesion characteristics can be realized. In the present invention, N-vinyl-2-pyrrolidone is exemplified as a particularly preferred N-vinyl cyclic amide.

The amount of the monomer m3 may be, for example, about 10 to 40% by weight based on the total amount of the monomer mixture. When the amount of the monomer m3 is higher than the above-described range, the characteristics of a pressure-sensitive adhesive layer formed with the composition under an environment at a low temperature (the adhesiveness as a pressure-sensitive adhesive, and the like) may be deteriorated. On the other hand, when the amount of the monomer m3 is lower than the above-described range, the adhesion force (for example, the peeling strength) or the repelling resistance tends to be lowered. By setting the amount of the monomer m3 of about 15 to 35% by weight based on the total amount of the monomer mixture, a more suitable result can be realized.

The total amount of the monomers m1, m2, and m3 can be, for example, about 70% by weight or more based on the total amount of the monomer mixture. The total amount thereof is preferably about 90% by weight or more based on the total amount of the monomer mixture (more preferably about 95% by weight or more). In a preferred embodiment of the pressure-sensitive adhesive composition as disclosed herein, the monomer mixture is substantially only composed of the monomers m1, m2, and m3 (that is, the total amount of the monomers m1, m2, and m3 is substantially 100% by weight based on the total amount of the monomer mixture). By this adhesive composition, an effect that a pressure-sensitive adhesive sheet having good cohesive force and repelling resistance can be formed can be obtained with a simple composition.

As for the technology as disclosed herein, the monomer mixture does not substantially contain a carboxyl group-containing monomer. Here, the "carboxyl group-containing monomer" refers to a vinyl monomer (an ethylenically unsaturated monomer) having at least one carboxyl group within one molecule thereof (which may be in the form of an anhydride). Specific examples of the carboxyl group-containing monomer include ethylenically unsaturated monocarboxylic acids such as (meth)acrylic acid and crotonic acid; ethylenically unsaturated dicarboxylic acids such as maleic acid, itaconic acid and citraconic acid; and anhydrides of ethylenically unsaturated dicarboxylic acids such as anhydrous maleic acid and anhydrous itaconic acid. Further, the expression that the monomer mixture "does not substantially contain" a carboxyl group-containing monomer means that monomer mixture does not contain any carboxyl group-containing monomer, or the amount thereof is 0.1% by weight or less based on the total amount of the monomer mixture.

It is preferable that the monomer mixture does not substantially contain a carboxyl group-containing monomer, as well as that the monomer mixture does not substantially contain an acidic group-containing monomer (a sulfonic acid group, a phosphoric acid group, and the like) in addition to the carboxyl group. That is, it is preferable that the monomer does not contain an acidic group-containing monomer in addition to the carboxyl group-containing monomer (which means that the monomer does not contain a carboxyl group-containing monomer and another acidic group-containing monomer), or that the total amount thereof is 0.1% by weight or less based on the total amount of the monomer mixture. This adhesive composition can form a pressure-sensitive adhesive layer which the corrosion of metal surface is highly protected when it is attached on the metal surface (that is, the corrosiveness on a metal surface is highly inhibited).

The monomer mixture can contain other monomers (that is, a monomer other than the monomers m1 to m3, which may be hereinafter referred to as a "monomer m4") as optional components, in addition to the monomers m1 to m3. By using the monomer m4, for example, various characteristics of the pressure-sensitive adhesive, the structure of the acrylic copolymer, or the like can be more appropriately controlled. As the monomer m4, one or more selected from various monomers that are copolymerizable with alkyl (meth)acrylate used herein, and do not have a carboxyl group (typically a carboxyl group and an acidic group other than a carboxyl group) can be employed. For example, various monomers that have one or more ethylenically unsaturated groups, for example, a (meth)acryloyl group, a vinyl group, and the like can also be used.

Examples of the monomer m4 include epoxy group-containing monomers such as glycidyl (meth)acrylate and allylglycidyl ether; alkoxy group-containing monomers such as methoxyethyl (meth)acrylate, methoxypropyl (meth)acrylate, (meth)acrylic acid methoxyethyleneglycol and (meth)acrylic acid methoxypolypropyleneglycol; cyano group-containing monomers such as acrylonitrile and methacrylonitrile; styrene-based monomers such as styrene and α-methylstyrene; α-olefins such as ethylene, propylene, isoprene, butadiene and isobutylene; isocyanate group-containing monomers such as 2-methacryloyloxyethylisocyanate; vinyl ester-based monomers such as vinyl acetate and vinyl propionate; vinyl ether-based monomers such as vinyl ether; heterocyclic group-containing (meth)acrylic esters such as tetrahydrofurfuryl (meth)acrylate; halogen atom-containing monomers such as fluorine(meth)acrylate; alkoxysilyl group-containing monomers such as 3-methacryloxypropyltrimethoxysilane and vinyltrimethoxysilane; siloxane bond-containing monomers such as silicone (meth) acrylate; alkyl (meth)acrylate in which $R^2$ in the formula (I) is an alkyl group having 21 or more carbon atoms; alicyclic hydrocarbon group-containing (meth)acrylates such as cyclopentyl (meth)acrylate, cyclohexyl (meth)acrylate, bornyl (meth)acrylate and isobornyl (meth)acrylate; and aromatic hydrocarbon group-containing (meth)acrylates such as phenyl (meth)acrylate, benzyl (meth)acrylate, phenoxyethyl (meth)acrylate and phenoxydiethyleneglycol (meth)acrylate.

Other examples of the monomer m4 include nitrogen atom-containing monomers other than the monomer m2 and the monomer m3. Examples thereof include N-acryloyl group-containing cyclic (meth)acrylamides such as N-(meth) acryloylmorpholine and N-acryloylpyrrolidine; amino group-containing monomers such as aminoethyl (meth)acrylate, N,N-dimethylaminoethyl (meth)acrylate and N,N-dimethylaminopropyl (meth)acrylate; maleimide backbone-containing monomers such as N-cyclohexylmaleimide and N-phenylmaleimide; and itaconimide-based monomers such as N-methylitaconimide, N-ethylitaconimide, N-butylitaconimide, N-2-ethylhexylitaconimide, N-laurylitaconimide and N-cyclohexylitaconimide.

Furthermore, as the monomer m4, for example, polyfunctional monomers such as ethyleneglycol di(meth)acrylate, diethyleneglycol di(meth)acrylate, triethyleneglycol di(meth)acrylate, tetraethyleneglycol di(meth)acrylate, polyethyleneglycol di(meth)acrylate, polypropyleneglycol di(meth)acrylate, neopentylglycol di(meth)acrylate, hexanediol di(meth)acrylate, pentaerythritol di(meth)acrylate, trimethylolpropane tri(meth)acrylate, pentaerythritol tri (meth)acrylate, dipentaerythritol hexa(meth)acrylate, epoxyacrylate, polyesteracrylate, urethaneacrylate, divinylbenzene, butyl di(meth)acrylate and hexyl di(meth)acrylate may be used.

Other examples of the monomer m4 include hydroxyl group-containing monomers, such as hydroxyalkyl (meth) acrylates such as 2-hydroxyethyl(meth)acrylate, 2-hydroxypropyl(meth)acrylate, 3-hydroxypropyl(meth)acrylate, 2-hydroxybutyl(meth)acrylate, 4-hydroxybutyl(meth)acrylate, 6-hydroxyhexyl(meth)acrylate, 8-hydroxyoctyl(meth) acrylate, 10-hydroxydecyl(meth)acrylate, 12-hydroxylauryl (meth)acrylate and [4-(hydroxymethyl)cyclohexyl]methyl acrylate; N-hydroxyalkyl(meth)acrylamides in which $R^4$ in the formula (II) is a hydroxyalkyl group having 1 or 5 or more carbon atoms; and alkenyl alcohols such as vinyl alcohol and allyl alcohol.

Moreover, in case where a hydroxyl group-containing monomer is used as the monomer m4, it is preferable to use a lower proportion of the hydroxyl group-containing monomer m4 than that of the monomer m2, from the viewpoint that the effect from the use of the monomer m2 can be more appropriately exhibited. In other words, it is preferable that the monomer m2 constitutes more than 50% by weight of the proportion (typically 60% by weight or more, more preferably 75% by weight or more, for example 90% by weight or more of the proportion) based on the total amount of the hydroxyl group-containing monomers contained in the monomer mixture. Alternatively, the hydroxyl group-containing monomer contained in the monomer mixture may be substantially only the monomer m2.

The amount of the monomer m4 (in case where two or more kinds are contained, it is the total amount thereof) is appropriately about 30% by weight or less based on the total amount of the monomer mixture. When the amount of the monomer m4 is too high, a pressure-sensitive adhesive sheet formed by using the composition may have deteriorated balance among the pressure-sensitive adhesive performances. The amount of the monomer m4 is preferably about 10% by weight or less, more preferably about 5% by weight or less (for example, about 2% by weight or less), based on the total amount of the monomer mixture. Alternatively, the monomer mixture may not substantially contain a monomer m4 (that is, the monomer mixture that contain substantially only the monomers m1 to m3).

The monomer mixture for the technology as disclosed herein preferably contains the monomers at the proportions, respectively, at which Tg of the acrylic copolymer formed by polymerization of approximately entire portion of the monomer mixture is about −10° C. or lower (typically about −10° C. to −70° C.), and more preferably contains the monomers at the proportions, respectively, at which Tg of the acrylic copolymer obtained by polymerization of the monomer mixture is about −20° C. or lower (typically about −20° C. to −70° C.). The composition of the monomer mixture may be adjusted such that the Tg is in the above-described range. Here, the Tg of acrylic copolymer refers to a value as determined from a Fox equation, on the basis of the Tg of the homopolymer of the monomers constituting the monomer mixture, and the weight fraction of the monomers (copolymerization composition). The value of the Tg of the homopolymer can be obtained from various known materials ("Handbook of Adhesion Technologies" of NIKKAN KOGYO SHIMBUN, LTD., "Polymer Handbook" in Wiley-Interscience, and the like).

A suitable embodiment of the pressure-sensitive adhesive composition as disclosed herein is a composition containing, as main ingredients, the monomer mixture or a partially polymerized product thereof (in other words, an acrylic copolymer material including the unpolymerized monomers). For example, it may be a pressure-sensitive adhesive composition contains the unpolymerized polymerizable functional group remaining in a significant amount (for example, about 50 to 100 mol % of the monomer mixture). This type of the pressure-sensitive adhesive composition is typically configured such that it may form a pressure-sensitive adhesive layer (including, as a base polymer, an acrylic copolymer obtained by polymerization of the monomer mixture), by applying the pressure-sensitive adhesive composition on a substrate to be described later, a release liner, or the like (which may be referred to as a "substrate"), and reacting a polymerizable functional group in the applied composition (polymerization) to cure the composition. The curing of the pressure-sensitive adhesive composition is preferably carried out while avoiding the contact with oxygen (for example, under an inert gas atmosphere such as a nitrogen gas).

The polymerization method (a method for curing the composition) in a case where the pressure-sensitive adhesive layer is formed with the pressure-sensitive adhesive composition is not particularly limited, but any method selected from various conventionally known polymerization methods can be appropriately employed. For example, any method selected from a polymerization method carried out by the irradiation of active energy rays such as light and a radioactive ray onto the composition (which may be hereinafter referred to a high energy ray); a polymerization method carried out using a thermal polymerization initiator (thermal polymerization methods such as a solution polymerization method, an emulsion polymerization method and a block polymerization method); and the like can be employed. As an example of preferable curing methods, a method irradiating an active energy ray (for example, light such as ultraviolet ray) can be mentioned. The pressure-sensitive adhesive composition as disclosed herein can be preferably carried out in the form of a composition configured to be cured by irradiation of such an active energy ray. This active energy ray-curable (typically photocurable) adhesive composition is advantageous in that it is capable of easily forming a thick adhesive layer. Further, such a pressure-sensitive adhesive composition is suitable to be provided in the form of a liquid composition containing substantially no organic solvent (of a non-solvent type). This is preferable from the viewpoint of environment friendliness, and the like.

This photocurable adhesive composition is typically prepared by using a photopolymerization initiator. For example, it can be in the forms of a pressure-sensitive adhesive composition obtained by mixing the monomer mixture and a photopolymerization initiator, and if necessary, blending with other components; a pressure-sensitive adhesive composition obtained by irradiating a mixture including the monomer mixture and a photopolymerization initiator with light to form a partially polymerized product of the monomer mixture, and if necessary, blending the partially polymerized product with other components; a pressure-sensitive adhesive composition obtained by further adding (post-adding) a photopolymerization initiator to the partially polymerized product; a pressure-sensitive adhesive composition obtained by forming a partially polymerized product of the monomer mixture in a method other than photopolymerization, and adding a photopolymerization initiator, and if necessary, other components to the partially polymerized product; and the like.

The photopolymerization initiator is not particularly limited, but it can be appropriately selected from various conventionally known materials in the field of a photocurable adhesive composition. Examples of the photopolymerization initiator include a ketal-based photopolymerization initiator, an acetophenone-based photopolymerization initiator, a benzoin ether-based photopolymerization initiator, an acylphosphine oxide-based photopolymerization initiator, an α-ketol-based photopolymerization initiator, an aromatic sulfonylchloride-based photopolymerization initiator, a photoactive oxime-based photopolymerization initiator, a benzoin-based photopolymerization initiator, a benzyl-based photopolymerization initiator, a benzophenone-based photopolymerization initiator and a thioxanthone-based photopolymerization initiator. These photopolymerization initiators may be used alone or in combination thereof.

Specific examples of the ketal-based photopolymerization initiator include 2,2-dimethoxy-1,2-diphenylethan-1-one [for example, trade name "Irgacure 651" (manufactured by Ciba Japan)]. Specific examples of the acetophenone-based photopolymerization initiator include 1-hydroxycyclohexylphenylketone [for example, trade name "Irgacure 184" (manufactured by Ciba Japan)], 2,2-diethoxyacetophenone, 2,2-dimethoxy-2-phenylacetophenone, 4-phenoxydichloroacetophenone and 4-(t-butyl)dichloroacetophenone. Specific examples of the benzoinether-based photopolymerization initiator include benzoinmethylether, benzoinethylether, benzoinpropylether, benzoinisopropylether and benzoinisobutylether. As the acylphosphineoxide-based photopolymerization initiator, a trade name "Lucirin TPO" (manufactured by BASF), or the like can be used. Specific examples of the α-ketol-based photopolymerization initiator include 2-methyl-2-hydroxypropiophenone and 1-[4-(2-hydroxyethyl)phenyl]-2-methylpropane-1-one. Specific examples of the aromatic sulfonyl chloride-based photopolymerization initiator include 2-naphthalenesulfonylchloride. Specific examples of the photoactive oxime-based photopolymerization initiator include 1-phenyl-1,1-propanedione-2-(o-ethoxycarbonyl)-oxime. Specific examples of the benzoin-based photopolymerization initiator include benzoin. Specific examples of the benzyl-based photopolymerization initiator include benzil. Specific examples of the benzophenone-based photopolymerization initiator include benzophenone, benzoyl benzoic acid, 3,3'-dimethyl-4-methoxybenzophenone, polyvinylbenzophenone and α-hydroxycyclohexylphenylketone. Specific examples of the thioxanthone-based photopolymerization initiator include thioxanthone, 2-chlorothioxanthone, 2-methylthioxanthone, 2,4-dimethylthioxanthone, isopropylthioxanthone, 2,4-diisopropylthioxanthone and dodecylthioxanthone.

The amount of the photopolymerization initiator to be used is not particularly limited. For example, the initiator may be used in an amount of about 0.001 to 5 parts by weight (preferably about 0.01 to 2 parts by weight, more preferably about 0.01 to 1 part by weight) based on 100 parts by weight of the total monomer mixture. Further, as used herein, the expression of the amount of the photopolymerization initiator to be used refers to the total amount of the photopolymerization initiator used in a process for preparing the pressure-sensitive adhesive composition. Accordingly, for a pressure-sensitive adhesive composition that is obtained by post-adding a photopolymerization initiator to a partially polymerized product obtained by irradiating a mixture of the monomer mixture and a photopolymerization initiator with light, it refers to the total amount of a fraction used for the partial polymerization and a fraction post-added.

The polymerization method for forming a partially polymerized product of the monomer mixture is not particularly limited, but any method selected from various conventionally known polymerization methods can be appropriately employed in the same manner as for the polymerization method (curing method) in a case where a pressure-sensitive adhesive layer is formed with the pressure-sensitive adhesive composition. For example, photopolymerization method in which a mixture obtained by mixing the monomer mixture and a photopolymerization initiator, and other components used as needed (a mixture substantially not containing a liquid medium such as an organic solvent, water, and the like (of a non-solvent type) is preferred) is irradiated with light can be preferably employed. The formation of the partially polymerized product is preferably carried out while avoiding the contact with oxygen (for example, under an inert gas atmosphere such as a nitrogen gas, and the like). Further, the polymerization method in a case of forming a partially polymerized product from the monomer mixture, and the polymerization method in a case of forming a pressure-sensitive adhesive layer from the pressure-sensitive adhesive composition having, as main ingredients, the partially polymerized product (that is, a polymerization method in a case of preparing a pressure-sensitive adhesive sheet using the composition) may be the same as or different from each other.

In a case where the pressure-sensitive adhesive composition as disclosed herein is a composition having, as main ingredients, a partially polymerized product (typically a photocurable adhesive composition), the conversion of the monomer mixture in the partially polymerized product (preferably a composition in a syrup state in which a polymer formed by polymerization of a part of the monomer mixture and the unpolymerized monomers coexist, and this partially polymerized product having such a state and property may be referred to as the "monomer syrup") can be, for example, about 2 to 40% by weight. Usually, the conversion is preferably about 5 to 20%. When the conversion is too high, it is easy to deteriorate the handlability of the pressure-sensitive adhesive composition. For example, there is a tendency that it is hard to obtain a composition in the form substantially not containing a liquid medium (of a non-solvent type) that exhibits good paintability at a normal temperature. On the other hand, when the conversion is too low, the characteristics of the pressure-sensitive adhesive obtained by curing (typically photocuring) the pressure-sensitive adhesive composition are likely to be unstable, and further, the viscosity of the composition may be too low to be applied.

Further, the conversion of the partially polymerized product is determined in the following method. That is, about 0.5 g of a sample is taken from the partially polymerized product, and weighed (weight: $W_{p1}$). Then, the sample is heated to 130° C. for 2 hours to volatile the unpolymerized monomers, and the sample remaining after heating is weighed (weight: $W_{p2}$). Further, the conversion can be determined by applying each of the obtained values to the following equation:

$$\text{Conversion}[\%]=(W_{p2}/W_{p1})\times 100.$$

The pressure-sensitive adhesive composition as disclosed herein can be, for example, a composition in the form in which an acrylic copolymer obtained by polymerization of approximately all of the monomer mixture is dissolved or dispersed in a suitable liquid medium (which may be an organic solvent, water, or a mixture thereof) (of a solvent-type, an aqueous solution type, an emulsion type, and the like). These forms of the pressure-sensitive adhesive compositions are typically configured such that it may form a pressure-sensitive adhesive layer having, as a base polymer, the acrylic copolymer, by applying the pressure-sensitive adhesive composition on a suitable substrate, and the like, and removing the solvent from the coated product (that is, drying the composition). At this time, a suitable crosslinking treatment, and the like may be carried out, if necessary.

For the pressure-sensitive adhesive composition containing, as main ingredients, an acrylic copolymer obtained by polymerization of approximately all of the monomer mixture (which may be an acrylic copolymer material containing substantially no unpolymerized monomers), a method for polymerizing the monomer mixture is not particularly limited, but various conventionally known polymerization methods can be appropriately employed in the same manner as in a case where the monomer mixture are partially polymerized. For example, if the acrylic copolymer is formed, for example, by a solution polymerization method, the embodiment of the solution polymerization is not particularly limited, and can be carried out by appropriately employing, for example, various known monomer supplying methods, polymerization conditions (a polymerization temperature, a polymerization time, a polymerization pressure, and the like), the materials to be used (a polymerization initiator, surfactant, and the like), by the same embodiment as the conventionally known common solution polymerization. As the monomer supplying method, any method such as a batch feed method for supplying a whole amount of the monomer mixture at once to a reaction vessel, a continuous supplying (dropping) method, a divided supplying (dropping) method, or the like can be employed. In a preferred embodiment, an embodiment in which a solution obtained by dissolving a whole amount of the monomer mixture and an initiator in a solvent is prepared in a reaction vessel, and then the monomer mixture are polymerized batchwise (batch polymerization) is exemplified. This batch polymerization is preferred, since it is easy to carry out the polymerization operation and the process control. In another preferred embodiment, an embodiment in which an initiator (typically a solution obtained by dissolving an initiator in a solvent) is prepared in a reaction vessel, and then monomer mixture are polymerized while dropping the solution dissolved in the solvent onto the reaction vessel (dropping polymerization or continuous polymerization) is exemplified. A part (some of kinds and/or partial proportion) of the monomer mixture is typically put into the reaction vessel with the solvent, and then the residual mixture may be dropped onto the reaction vessel.

Examples of the thermal polymerization initiator include azo-based compounds (azo-based initiators) such as 2,2'-azobisisobutyronitrile, 2,2'-azobis-2-methylbutyronitrile, dimethyl 2,2'-azobis(2-methylpropionate), 4,4'-azobis-4-cyanovaleric acid, azobisisovaleronitrile, 2,2'-azobis(2-amidinopropane)dihydrochloride, 2,2'-azobis[2-(5-methyl-2-imidazolin-2-yl)propane]dihydrochloride, 2,2'-azobis(2-methylpropionamidine)disulfate, 2,2'-azobis(N,N'-dimethyleneisobutylamidine)dihydrochloride and 2,2'-azobis[N-(2-carboxyethyl)-2-methylpropionamidine] hydrate; persulfates such as potassium persulfate and ammonium persulfate; peroxides (peroxide-based initiators) such as dibenzoyl peroxide, tert-butyl permaleate, t-butyl hydroxyperoxide and hydrogen peroxide; substituted ethane-based initiators such as phenyl-substituted ethane; redox system initiators such as a combination of a persulfate and sodium hydrogen sulfite, and a combination of a peroxide and sodium ascorbate. In a case where the monomer mixture is polymerized by the thermal polymerization method, a polymerization temperature at, for example, around 20 to 100° C. (typically 40 to 80° C.) can be appropriately employed.

In a preferred embodiment of the pressure-sensitive adhesive composition as disclosed herein, the composition contains a crosslinking agent. By using the crosslinking agent, a pressure-sensitive adhesive layer formed from the composition can be provided with suitable cohesive force and adhesive force, and the repelling resistance of the pressure-sensitive adhesive layer can also be improved. Any crosslinking agent can be appropriately selected from various conventionally known materials in the field of a pressure-sensitive adhesive. For example, an isocyanate-based compound (an isocyanate-based crosslinking agent), an epoxy-based crosslinking agent, an aziridine-based crosslinking agent, a melamine-based crosslinking agent, a metal chelate-based crosslinking agent, a metal salt-based crosslinking agent, a peroxide-based crosslinking agent, an oxazoline-based crosslinking agent, an urea-based crosslinking agent, an amino-based crosslinking agent, a carbodiimide-based crosslinking agent, a coupling agent-based crosslinking agent (for example, a silane coupling agent), or the like can be used. These crosslinking agents may be used alone or in combination thereof. This crosslinking agent can be preferably blended into the composition in the form in which an acrylic copolymer formed by polymerization of approximately all of the monomer mixture is dissolved or dispersed in a suitable liquid medium as in the solvent-type adhesive composition. Among these, the isocyanate-based crosslinking agent is preferably used. In a preferred embodiment, as the crosslinking agent, only one or more (typically one) isocyanate-based crosslinking agent is used. Alternatively, within a range not clearly interfering with the effect of the present invention, the crosslinking agents other than the isocyanate-based crosslinking agent can be used in combination with the isocyanate-based crosslinking agent.

Examples of the isocyanate-based compound include aliphatic polyisocyanates such as 1,6-hexamethylene diisocyanate, 1,4-tetramethylene diisocyanate, 2-methyl-1,5-pentane diisocyanate, 3-methyl-1,5-pentane diisocyanate, lysine diisocyanate, and the like; alicyclic polyisocyanates such as isophorone diisocyanate, cyclohexyl diisocyanate, hydrogenated tolylene diisocyanate, hydrogenated xylene diisocyanate, hydrogenated diphenylmethane diisocyanate, hydrogenated tetramethylxylene diisocyanate, and the like; aromatic polyisocyanates such as 2,4-tolylene diisocyanate, 2,6-tolylene diisocyanate, 4,4'-diphenylmethane diisocyanate, 2,4'-diphenylmethane diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, and the like; aromatic, aliphatic polyisocyanates such as xylene-1,4-diisocyanate, xylene-1,3-diisocyanate, and the like; etc.

Further, as the isocyanate-based crosslinking agent, a dimer or trimer, a reaction product, or a polymerized product of the above-exemplified isocyanate-based compound (for example, a dimer or trimer of diphenylmethane diisocyanate, a reaction product of trimethylolpropane and tolylene diisocyanate, a reaction product of trimethylolpropane and hexamethylene diisocyanate, polymethylenepolyphenylisocyanate, polyetherpolyisocyanate, polyesterpolyisocyanate), or the like can be used. For example, a reaction product of trimethylolpropane and tolylene diisocyanate can be preferably used.

The amount of the isocyanate-based crosslinking agent to be used can be, for example, about 0.01 to 20 parts by weight (preferably about 0.01 to 15 parts by weight), based on 100 parts by weight of the monomer mixture (in a case of the polymerization conversion of the monomer mixture in the pressure-sensitive adhesive composition is about 100%, it usually corresponds to 100 parts by weight of an acrylic copolymer). When the amount of the crosslinking agent to be used is too low, it is hard to exhibit a sufficient effect (an effect of improving the pressure-sensitive adhesive performance), and when the amount thereof to be used is too high, it is easy to spoil the balance among the adhesion characteristics. Usually, it is suitable to use about 0.01 to 1 parts by weight (preferably about 0.02 to 1 parts by weight, for example, about 0.05 to 0.5 parts by weight) of the isocyanate-based crosslinking agent, based on 100 parts by weight of the monomer mixture.

In a case where the pressure-sensitive adhesive composition as disclosed herein is a composition contains, as the main ingredients, the monomer mixture or a partially polymerized product thereof (typically, a photocurable adhesive composition), polyfunctional (meth) acrylate (that is, a monomer containing two or more (meth)acryloyl groups within one molecule thereof) can be preferably used as the crosslinking agent. For example, one or more selected from the polyfunctional (meth)acrylates exemplified in the description on the monomer m4 can be used. Suitable examples thereof include 1,6-hexanediol di(meth)acrylate, trimethylolpropane tri(meth)acrylate, pentaerythritol tetra(meth)acrylate and 1,2-ethylenglycol di(meth)acrylate. From the viewpoint of the polymerization reactivity (crosslinking reactivity), and the like, polyfunctional acrylate is preferably used. For the pressure-sensitive adhesive composition having a partially polymerized product of the monomer mixture as the main ingredients, it is preferable to partially polymerizing the monomer mixture, and then blending polyfunctional monomers therewith (that is, post-addition). In a preferred embodiment, as the crosslinking agent, only one or more (typically one) polyfunctional (meth)acrylate is used. Alternatively, within a range not clearly interfering with the effect of the present invention, a crosslinking agent other than the polyfunctional (meth)acrylate (for example, an isocyanate-based crosslinking agent) can be used in combination with the polyfunctional (meth)acrylate.

The amount of the polyfunctional (meth) acrylate to be used for blending as a crosslinking agent is, for example, about 0.001 to 5 parts by weight, and usually suitably about 0.005 to 1 part by weight (for example, about 0.005 to 0.1 part by weight), based on 100 parts by weight of the monomer mixture. When the amount of the polyfunctional (meth)acrylate to be used is too low, a sufficient crosslinking effect is not exhibited, and there is a tendency that the cohesive force or the repelling resistance is reduced. On the other hand, when the amount of the polyfunctional (meth)acrylate to be used is too high, the elasticity of the pressure-sensitive adhesive formed after curing increases too high, and the adhesive force or the tackiness may be easily reduced.

In the pressure-sensitive adhesive layer provided on the pressure-sensitive adhesive sheet as disclosed herein, the pressure-sensitive adhesive layer preferably includes a pressure-sensitive adhesive having a gel fraction of, for example, about 25 to 75%. In order to form a pressure-sensitive adhesive having the gel fraction (a pressure-sensitive adhesive after crosslinking in the composition including a crosslinking agent), the conditions such as the monomer composition (for example, the amount of the monomer m2 to be used), the polymerization degree of the monomer mixture in the pressure-sensitive adhesive composition, the molecular weight of the acrylic copolymer, the condition for forming the pressure-sensitive adhesive layer (drying condition, light irradiation condition, and the like), the kind and the amount of the crosslinking agent to be used, and the like may be appropriately set. When the gel fraction of the pressure-sensitive adhesive is too low, there is a tendency of insufficient cohesive force or repelling resistance. On the other hand, when the gel fraction thereof is too high, the pressure-sensitive adhesive force or the tackiness may be easily reduced. By the pressure-sensitive adhesive having a gel fraction in a range of about 25 to 75% (for example, about 30 to 60%), better adhesive performances can be realized.

As used herein, "the gel fraction of the pressure-sensitive adhesive" refers to a value as measured in the following method. The gel fraction can be understood as a weight ratio of the ethyl acetate-insoluble components in the pressure-sensitive adhesive.

Method for Measuring Gel Fraction

A pressure-sensitive adhesive sample (weight: $W_{b1}$) is enclosed with a porous polytetrafluoroethylene film (weight: $W_{b2}$) having an average pore diameter of 0.2 μm in a bag shape, and the opening part thereof is tied with a kite string (weight $W_{b3}$). This bag is immersed in 50 mL of ethyl acetate, and left to stand at room temperature (typically 23° C.) for 7 days. Then, the bag is taken out, and ethyl acetate remaining on the outer surface of the bag is wiped out. The bag is dried at 130° C. for 2 hours, and the weight of the bag ($W_{b4}$) is measured. The gel fraction of the pressure-sensitive adhesive is determined by applying each value to the following equation:

$$\text{Gel Fraction}[\%]=[(W_{b4}-W_{b2}-W_{b3})/W_{b1}]\times 100$$

Further, it is desirable to use a trade name "NITOFLON (registered trademark) NTF1122" (average pore diameter: 0.2 μm, porosity: 75%, and thickness: 85 μm), or an equivalent one thereof, available from Nitto Denko Corporation, as the porous polytetrafluoroethylene (PTFE) film.

The pressure-sensitive adhesive composition as disclosed herein can contain, as an optional component, various additives that are common in the field of the pressure-sensitive adhesive compositions. Examples of this optional component include a tackifier (a rosin-based resin, a petroleum-based resin, a terpene-based resin, a phenol-based resin, a ketone-based resin, and the like), a plasticizer, a softener, a filler, a colorant (a pigment, a dye, and the like), an antioxidant, a labeling agent, a stabilizer and a preservative. These additives can be used by a usual method, employing ones conventionally known, and do not particularly characterize the present invention, and hence the detailed description thereof is omitted here.

Furthermore, the pressure-sensitive adhesive composition as disclosed herein can be appropriately blended with a polymer, apart from the copolymer formed by polymerization of the monomer mixture for the purpose of adjusting the viscosity (typically of thickening). The use of the polymer for adjusting the viscosity is particularly effective for the pressure-sensitive adhesive composition (typically, the photocurable adhesive composition), having, as main ingredients, the monomer mixture or a partially polymerized product thereof. Examples of the polymer for adjusting the viscosity include a styrene butadiene rubber (SER), isoprene rubber (IR), a styrene butadiene-styrene block copolymer (SBS), an ethylene-acetic acid vinyl copolymer, an acryl rubber, polyurethane, polyester, and the like. In addition, an acrylic polymer obtained by copolymerizing alkyl (meth)acrylate with a functional monomer (for example, one or more selected from the acrylic monomers having functional groups such as acrylamide, acrylonitrile and acryloylmorpholine, acrylic acid) may be used as the polymer for adjusting the viscosity. It is preferable to employ a polymer for adjusting the viscosity, which does not substantially contain a carboxyl group (more preferably a carboxyl group and an acidic group other than the carboxyl group).

These polymers for adjusting the viscosity may be used alone or in combination thereof, but they are preferably used in an amount in a range of about 40% by weight or less (typically about 5 to 40% by weight) based on the entire pressure-sensitive adhesive formed with the pressure-sensitive adhesive composition. That is to say, it is preferable that the proportion of the polymer for adjusting the viscosity is about 40% by weight or less (more preferably about 20% by weight or less) of the pressure-sensitive adhesive forming components contained in the composition.

The pressure-sensitive adhesive composition as disclosed herein is preferably configured such that about 50% by weight or more (more preferably about 70% by weight or more, for example 90% by weight or more) of the acrylic copolymer obtained by polymerization of the monomer mixture is contained in a pressure-sensitive adhesive formed with the composition. This adhesive composition may form a pressure-sensitive adhesive with better adhesive performance.

The pressure-sensitive adhesive sheet according to the present invention includes a pressure-sensitive adhesive layer formed with any one of the pressure-sensitive adhesive compositions as disclosed herein. It may be a pressure-sensitive adhesive sheet attached on the substrate, in which such a pressure-sensitive adhesive layer is provided as affixed one surface or both surfaces of a sheet-like substrate (support) (without an intention for separating the pressure-sensitive adhesive layer from the substrate), or a pressure-sensitive adhesive sheet without a substrate, in which the pressure-sensitive adhesive layer is provided on a support having releasability, for example, a release liner (a release paper, a resin sheet having its surface subjected to release treatment, and the like). As for the concept of the pressure-sensitive adhesive sheet as referred to herein, those referred to a pressure-sensitive adhesive tape, a pressure-sensitive adhesive label, a pressure-sensitive adhesive film, and the like are encompassed. In addition, the pressure-sensitive adhesive layer is not limited to ones that are continuously formed, but it may be adhesive layers formed for example, in the regular patterns such as a point form, a stripe form, and the like, or in the random patterns.

Figure 2:
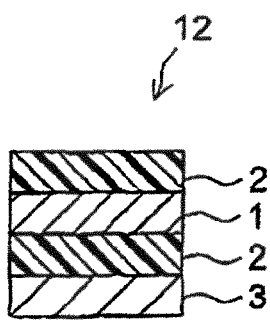
FIG. 2 is another schematic cross-sectional view showing the configuration example of the pressure-sensitive adhesive sheet according to the present invention.

The pressure-sensitive adhesive sheet as disclosed herein may be, for example, one having a cross-section structure as schematically shown in FIGS. 1 to 6. Among these, FIG. 1 and FIG. 2 are examples of configurations of a double-sided adhesive type of a pressure-sensitive adhesive sheet attached on a substrate. The pressure-sensitive adhesive sheet 11 as shown in FIG. 1 includes the pressure-sensitive adhesive layers 2 on the both sides of the substrate 1, and the pressure-sensitive adhesive layers 2 are each configured such that they are protected with a release liner 3 having at least the side of the pressure-sensitive adhesive layer with a release surface. The pressure-sensitive adhesive sheet 12 as shown in FIG. 2 is configured such that the both sides of the substrate 1 are provided with the pressure-sensitive adhesive layers 2, and at least one of these adhesive layers is protected with a release liner 3 having both sides of the pressure-sensitive adhesive layer with a release surface. This kind of the pressure-sensitive adhesive sheet 12 can be configured such that the pressure-sensitive adhesive layer on the other side is contacted with the back side of the release liner 3 when the pressure-sensitive adhesive sheet 12 is wound, and the pressure-sensitive adhesive layer on the other side is also protected with the release liner 3.

Figure 3:
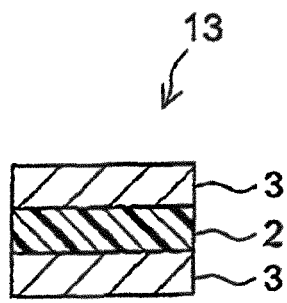
FIG. 3 is a still another schematic cross-sectional view showing the configuration example of the pressure-sensitive adhesive sheet according to the present invention.
Figure 4:
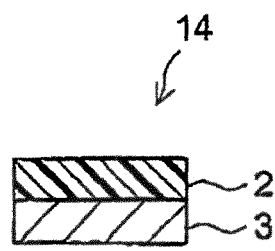
FIG. 4 is a further schematic cross-sectional view showing the configuration example of the pressure-sensitive adhesive sheet according to the present invention.

FIG. 3 and FIG. 4 are examples of the configurations of the pressure-sensitive adhesive sheet without a substrate. The pressure-sensitive adhesive sheet 13 as shown in FIG. 3 is configured such that the both sides of the pressure-sensitive adhesive layer 2 without a substrate are protected with a release liner 3 having at least the side of the pressure-sensitive adhesive layer with a release surface. The pressure-sensitive adhesive sheet 14 as shown in FIG. 4 can be configured such that one side of the pressure-sensitive adhesive layer 2 without a substrate is protected with a release liner 3 having the both sides with a release surface, and when this sheet is wound, the other side of the pressure-sensitive adhesive layer 2 is contacted with the release liner 3, and the other side is also protected with the release liner 3.

Figure 5:
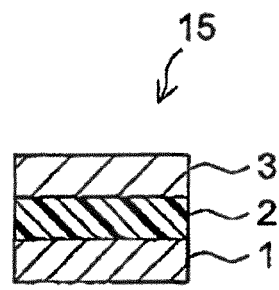
FIG. 5 is a still further schematic cross-sectional view showing the configuration example of the pressure-sensitive adhesive sheet according to the present invention.
Figure 6:
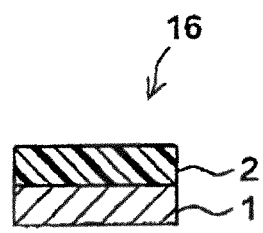
FIG. 6 is a still more further schematic cross-sectional view showing the configuration example of the pressure-sensitive adhesive sheet according to the present invention.

FIG. 5 and FIG. 6 are examples of the configurations of a one-sided adhesive type of a pressure-sensitive adhesive sheet attached on a substrate. The pressure-sensitive adhesive sheet 15 as shown in FIG. 5 is configured such that one side of the substrate 1 is provided with the pressure-sensitive adhesive layer 2, and the surface (adhered surface) of the pressure-sensitive adhesive layer 2 is protected with the release liner 3 having at least the side of the pressure-sensitive adhesive layer with a release surface. The pressure-sensitive adhesive sheet 16 as shown in FIG. 6 is configured such that one side of the substrate 1 is provided with the pressure-sensitive adhesive layer 2. It can be configured such that the other side of the substrate 1 has a release surface, and if the pressure-sensitive adhesive sheet 16 is wound, the pressure-sensitive adhesive layer 2 is contacted with the other side, and the surface (adhered surface) of the pressure-sensitive adhesive layer is protected on the other side of the substrate 1.

A substrate constituting the pressure-sensitive adhesive sheet can be appropriately selected, for example, from plastic films such as a polypropylene film, an ethylene-propylene copolymer film, a polyester film and a polyvinyl chloride film; foam substrates such as a polyurethane foam and a polyethylene foam; papers such as a craft paper, a crepe paper and a Japanese paper; cloth such as cotton and stable fibers; non-woven fabrics such as a polyester non-woven fabric and a vinylon non-woven fabric; metal foils such as an aluminum foil and a copper foil; and the like according to the applications of the pressure-sensitive adhesive sheet, and used. As the plastic film, both of a non-stretched film and a stretched (monoaxially stretched or biaxially stretched) film can be used. Further, the side provided with a pressure-sensitive adhesive layer in the substrate may be surface treated with a primer application, corona discharge treatment, and the like. The thickness of the substrate can be appropriately selected according to the purposes, but generally, it is usually from about 10 μm to 500 μm (typically from 10 μm to 200 μm).

The pressure-sensitive adhesive layer can be preferably formed, for example, by placing (typically applying) any one of the pressure-sensitive adhesive compositions as disclosed herein, that is, a pressure-sensitive adhesive compositions containing, as main ingredients, the monomer mixture or a partially polymerized product thereof, on a support (a substrate or a release liner), and carrying out the curing (polymerization) by irradiating the composition with an active energy ray (for example, an ultraviolet ray). By the method for forming the pressure-sensitive adhesive layer, a more suitable result can be realized, for example, from the viewpoint of the heat resistance of the pressure-sensitive adhesive layer. In the formation method, an acrylic copolymer obtained by polymerization of the monomer mixture (a base polymer in the pressure-sensitive adhesive layer) is synthesized, and at the same time, a pressure-sensitive adhesive layer is formed. This method can be preferably applied for an active energy ray-curable adhesive composition prepared by blending the monomer mixture (a mixture of the non-polymerized monomers), or a partially polymerized product obtained by the partial polymerization of the monomer mixture in an appropriate polymerization method (for example, a photopolymerization method) with a photopolymerization initiator, and a crosslinking agent used as needed (polyfunctional (meth)acrylate, and the like). This active energy ray-curable adhesive composition can be a composition substantially not containing a liquid medium (an organic solvent, water, and the like) (of a non-solvent). For the active energy ray-curable adhesive composition in the form including a liquid medium, it is preferable to dry the composition provided on the support, and then irradiating an active energy ray thereon.

Moreover, the pressure-sensitive adhesive layer can be also formed by placing (typically applying) any one of the pressure-sensitive adhesive compositions as disclosed herein on a support (a substrate or a release liner), and drying the composition. The method for forming the pressure-sensitive adhesive layer can be preferably applied for a pressure-sensitive adhesive composition in the form in which an acrylic copolymer obtained by polymerization of approximately all of the monomer mixture and a crosslinking agent, an additive, and the like used as needed are dissolved or dispersed in a liquid medium in advance in an appropriate polymerization method (typically a thermal polymerization method). In a case of the pressure-sensitive adhesive composition including the crosslinking agent, appropriate crosslinking may be carried out, if necessary, in addition to the drying as above.

The application of the pressure-sensitive adhesive composition can be carried out using a common coater such as, for example, a gravure roll coater, a reverse roll coater, a kiss-roll coater, a dip roll coater, a bar coater, a knife coater, a spray coater, and the like. From a viewpoint of promoting a crosslinking reaction, improving the preparation efficiency, and the like, the pressure-sensitive adhesive composition can be preferably dried under heating. The temperature for drying varies depending on the kinds of the support on which the composition is applied, but a drying temperature, for example, in a range of about 40 to 150° C. can be employed.

Further, in a case of a pressure-sensitive adhesive sheet attached on a substrate, the pressure-sensitive adhesive composition may be directly placed on a substrate to form a pressure-sensitive adhesive layer, and the pressure-sensitive adhesive layer formed on a release liner may be transferred on a substrate.

The thickness of the pressure-sensitive adhesive layer is not particularly limited, but is usually, for example, about 10 μm or more (preferably about 20 μm or more, more preferably about 30 μm or more), whereby good adhesive performances (for example, adhesive strength) can be realized. Further, usually, it is preferable that the thickness is about 400 μm or less (typically about 200 μm or less, for example, about 100 μm or less).

EXAMPLES

Hereinbelow, several Examples of the present invention are described, but it is not construed the present invention is intended to be limited to these Examples. Further, in the following description, "parts" and "%" are based on the weight unless otherwise specifically stated.

Example 1

To 100 parts of the monomer mixture including 70 parts of 2-ethylhexylacrylate (2EHA, Tg of the homopolymer: −70° C.), 30 parts of N-vinyl-2-pyrrolidone (NVP, Tg of the homopolymer: 54° C.), and 4 parts of N-hydroxyethylacrylamide (HEAA, Tg of the homopolymer: 98° C.), 0.05 part of 2,2-dimethoxy-1,2-diphenylethan-1-one (a trade name "Irgacure 651" (manufactured by Ciba Japan)), and 0.05 part of 1-hydroxy-cyclohexyl-phenylketone (a trade name "Irgacure 184" (manufactured by Ciba Japan)) as photopolymerization initiators were blended. The dissolved oxygen was sufficiently removed from this mixture by stirring under a nitrogen gas atmosphere, and an ultraviolet ray was irradiated onto the mixture to obtain an acrylic copolymer material (monomer syrup) obtained by the partial polymerization (a conversion (monomer conversion): about 11%) of the monomer mixture. For this monomer syrup, as the inner crosslinking agent, 0.01 part of 1,6-hexanediol diacrylate (HDDA) was added, based on 100 parts of the monomer mixture. As such, the photocurable pressure-sensitive adhesive composition according to Example 1 was prepared.

Two sheets of the release liners (thickness: 38 μm) that had been release-treated by a silicone-based releasing agent were prepared on the surface of a polyethylene terephthalate (PET) film. The above-described adhesive composition was applied onto the release surface (the surface that had been treated with a releasing agent) of the first sheet of the release liner. At this time, the application amount was adjusted such that the finally obtained adhesive layer had a thickness of 50 μm. Then, the applied adhesive composition was stack with the release surface of the second release liner. Further, by irradiation of an ultraviolet ray under the conditions of a light intensity of about 4 mW/cm$^2$ and a light amount of about 720 mJ/cm$^2$, the composition was cured to form a pressure-sensitive adhesive layer. As such, a pressure-sensitive adhesive sheet (a release liner-attached adhesive sheet) configured such that the both sides of the pressure-sensitive adhesive layer were protected with the release liners was prepared.

The gel fraction of the pressure-sensitive adhesive constituting the pressure-sensitive adhesive layer of the pressure-sensitive adhesive sheet according to the present Example was measured in accordance with the method for measuring a gel fraction in the following manner. That is, a porous PTFE film having a size of 100 mm×100 mm (a trade name "NITOFLON (registered trademark) NTF1122", manufactured by Nitto Denko Corporation) and a kite string having a length of about 100 mm (thickness: 1.5 mm) were prepared, and the weight thereof were measured. Both the release liners were peeled from a cut size of 20 cm² of the release liner-attached pressure-sensitive adhesive sheet, and the pressure-sensitive adhesive sample was enclosed with the PTFE film in a bag shape, and the opening part thereof was tied with a kite string. The weight of the bag was measured, and the weight of the PTFE film ($W_{b2}$) and the weight of the kite string ($W_{b3}$) were subtracted from the weight of the bag to determine the weight of the pressure-sensitive adhesive sample ($W_{b1}$). Then, the bag was immersed in 50 mL of ethyl acetate, and left to stand at room temperature (typically 23° C.) for 7 days. Thereafter, the bag was taken out of ethyl acetate, and ethyl acetate remaining on the outer surface of the bag was wiped out. The bag was dried in a drier at 130° C. for 2 hours, and then the weight of the bag ($W_{b4}$) was measured. The gel fraction of the pressure-sensitive adhesive as determined by applying each value to the equation as described earlier was 49.9%.

Examples 2 to 5

A pressure-sensitive adhesive composition was prepared in the same manner as in Example 1, except that the monomer mixture of the composition shown in Table 1 (in the table, "AA" represents acrylic acid; Tg of the homopolymer: 106° C.) was used, and that the amounts of HDDA to be added were 0.02 part in Example 3 and 0.04 part in Example 5, respectively, and a pressure-sensitive adhesive sheet was prepared based on 100 parts of the monomer mixture. The gel fractions of the pressure-sensitive adhesive as measured in the same manner as in Example 1 were 48% in Example 2, 68.1% in Example 3, 81.9% in Example 4, and 60% in Example 5, respectively.

For the pressure-sensitive adhesive sheet prepared in Examples 1 to 5 (which are provided with the pressure-sensitive adhesive layers formed from an ultraviolet ray-curable adhesive composition), the following evaluation tests were carried out.

Corrosiveness

One side of the release liner was peeled from the pressure-sensitive adhesive sheet according to each of Examples to expose one side of the pressure-sensitive adhesive layer, and a transparent PET film having a thickness of 25 μm (which had not been release-treated) was attached and supported thereon. In addition, the release liner on the other side was peeled to expose the other side of the pressure-sensitive adhesive layer, and this was attached and combined with a copper foil having a thickness of 80 μm, and then maintained at an atmosphere of 60° C.×95% RH for 250 hours. Thereafter, the surface of the copper foil at a portion attached with the pressure-sensitive adhesive sheet was observed with naked eyes on the side of the PET film, the presence or absence of the corrosion of the surface of the copper foil was confirmed using the color change in the surface of the copper foil as an index. As a result, a case where the color change in the surface of the copper foil was not confirmed was denoted as "absence" of the corrosiveness, whereas a case where the color change in the surface of the copper foil was confirmed was denoted as "presence" of the corrosiveness.

Adhesive Force

One side of the release liner was peeled from the pressure-sensitive adhesive sheet according to each of Examples to expose one side of the pressure-sensitive adhesive layer, and a PET film having a thickness of 50 μm (which had not been release-treated) was attached and supported thereon. This supported adhesive sheet was cut into a width of 25 mm to prepare a test piece. As an object to be adhered, a clean acrylic plate obtained by reciprocatingly rubbing and washing a clean waste to which isopropyl alcohol had been immersed 10 times was used. The release liner on the other side was peeled from the test piece, and was pressed onto the object to be adhered in such a manner that a 5 kg roller was rolled once. After storing it at 40° C. for 2 days, it was taken out under a measurement environment of 23° C.×50% RH, left to stand for 30 minutes, and a peeling strength (N/25 mm) was measured using a tension tester under the condition of a tension rate of 300 mm/min, and a peeling angle of 180°.

Repelling Resistance

The pressure-sensitive adhesive sheet according to each of Examples was cut into a size of a width of 10 mm and a length of 90 mm, and the release liner was peeled from one side. Then, an aluminum plate having the same size (thickness: 0.5 mm) was attached and combined therewith to prepare a test piece. This test piece was bent along a cord of φ50 mm in the longitudinal direction with the side of an aluminum plate inside (that is, a curvature of R50). Then, the release liner was peeled from the other side of the test piece, and pressed such that no floating occurred using a laminator on the surface of a polypropylene plate that had been washed in the same manner as described above. This was left to stand in an environment of 23° C. for 4 hours or 7 hours, and then the floating height (mm) of an edge of the test piece in the longitudinal direction over the surface of the polypropylene plate was measured. The measurement was carried out on the both ends of the test piece, and the total value of the floating heights for the both ends was taken as a value of repelling resistance.

Holding Power

As an index of the cohesive force, the holding power (static load characteristics) of the pressure-sensitive adhesive sheet according to each of Examples was evaluated in the following manner. That is, the release liner on one side was peeled from the pressure-sensitive adhesive sheet to expose one side of the pressure-sensitive adhesive layer, and a PET film having a thickness of 50 μm (which had not been release-treated) was attached and supported thereon. This supported adhesive sheet was cut into a size of a width of 10 mm and a length of 50 mm to prepare a test piece. As an object to be adhered, a clean Bakelite plate washed by reciprocatingly rubbing a clean waste in which toluene had been immersed 10 times was used. The release liner on the other side was peeled from the test piece, and was pressed onto the object to be adhered in such a manner that a 2 kg roller was rolled reciprocatingly at a contact area of a width of 10 mm and a length of 20 mm. After maintaining it at 40° C. for 30 minutes, the Bakelite plate was taken down under an environment of 40° C., and after giving 500 g of a load to a free end of the test piece (a protruding portion of the Bakelite plate), left to stand under an environment of 40° C. for 2 hours. After giving the load and before the lapse of 2 hours thereafter, a case where the test piece was dropped from the object to be adhered was denoted as "bad" holding power, whereas a case where the test piece was held in the object to be adhered even after 2 hours had passed was denoted as "good" holding power.

The results of the evaluation tests are shown in Table 1. In this table, the composition (the kinds and amount ratios of the monomers to be used) of the monomer mixture used in the preparation of the pressure-sensitive adhesive composition according to each of Examples are shown together with the Tg as determined from the composition on the basis of the Fox equation.

TABLE 1

| | Monomer mixture (part) | | | | Tg | | Repelling resistance (mm) | | Peeling strength | Holding |
|---|---|---|---|---|---|---|---|---|---|---|
| | 2EHA | NVP | HEAA | AA | (° C.) | Corrosiveness | 4 hr | 7 hr | (N/25 mm) | power |
| Example 1 | 70 | 30 | 4 | | −41 | Absence | 0 | 2.2 | 22.4 | Good |
| Example 2 | 70 | 26 | 4 | | −43 | Absence | 0 | 0.8 | 23.7 | Good |
| Example 3 | 70 | 30 | | | −44 | Absence | 7.9 | 15.3 | 23.2 | Good |
| Example 4 | 48 | 48 | 4 | | −19 | Absence | 50 | 50 | 1.3 | Good |
| Example 5 | 90 | | | 10 | −60 | Presence | 0.7 | 6.2 | 20 | Good |

As shown in Table 1, as compared with the pressure-sensitive adhesive sheet having the copolymerization composition including the monomer m1 (2EHA) and the monomer m3 (NVP) and not including the monomer m2 in the present invention (Example 3), according to the pressure-sensitive adhesive sheet having the copolymerization composition further including the monomer m2 (here, HEAA) in addition to the monomers m1 and m3 (Examples 1 and 2), the repelling resistance was remarkably improved while other characteristics were equivalently maintained. As a result, according to the pressure-sensitive adhesive sheets of Examples 1 and 2, equivalent or more levels of the repelling resistance and the peeling strength were realized, as compared with the pressure-sensitive adhesive sheet of Example 5 obtained by using carboxyl group-containing monomers (here, AA) of general adhesive compositions. Further, the pressure-sensitive adhesive sheet according to Example 4 having a too high amount of the monomer m3 was deficient in the balance among the adhesion characteristics. Further, the pressure-sensitive adhesive sheets according to Example 1 to 4 did not have corrosiveness on a metal surface, and also had sufficient holding power. On the other hand, it was confirmed that the pressure-sensitive adhesive sheet of Example 5 obtained by using AA exhibits better adhesion characteristics than the pressure-sensitive adhesive sheet according to Example 3, but it corrodes the metal surface.

Examples 6 and 7

Pressure-sensitive adhesive compositions were prepared in the same manner as in Example 1, except that the monomer mixture of the composition shown in Table 2 (in the table, "BA" represents butyl acrylate; Tg of the homopolymer; −54° C.) were used, and that the amount of HDDA to be added was 0.03 part for either Example 6 or 7, based 100 parts of the monomer mixture, and pressure-sensitive adhesive sheets were prepared using the compositions. The gel fractions of the pressure-sensitive adhesives were 28.7% in Example 6 and 53% in Example 7, respectively.

Examples 8 and 9

Pressure-sensitive adhesive compositions were prepared in the same manner as in Example 1, except that the monomer mixture of the composition shown in Table 2 (in the table, "DEAA" represents NN-diethyl acrylamide; Tg of the homopolymer: 81° C.) were used, and that the amounts of HDDA to be added were 0.05 part in Example 8 and 0.06 part in Example 9, respectively, based 100 parts of the monomer mixture, and pressure-sensitive adhesive sheets were prepared using the compositions. The gel fractions of the pressure-sensitive adhesives were 30.2% in Example 8 and 19.7% in Example 9, respectively.

The evaluation tests as described above were carried out on the pressure-sensitive adhesive sheets prepared in Examples 6 to 9 (which are provided with adhesive layers formed from the ultraviolet-curable type adhesive compositions). The results are shown in Table 2.

TABLE 2

| | Monomer mixture (part) | | | | | Tg | | Repelling resistance (mm) | | Peeling strength | Holding |
|---|---|---|---|---|---|---|---|---|---|---|---|
| | BA | 2EHA | NVP | DEAA | HEAA | (° C.) | Corrosiveness | 4 hr | 7 hr | (N/25 mm) | power |
| Example 6 | 78 | | 13 | | 9 | −45 | Absence | 1.1 | 1.4 | 16.6 | Good |
| Example 7 | 78 | | 22 | | | −46 | Absence | 3.0 | 9.3 | 18.0 | Good |
| Example 8 | | 70 | | 26 | 4 | −40 | Absence | 0.1 | 0.3 | 21.3 | Good |
| Example 9 | | 70 | | 30 | | −40 | Absence | 7.9 | 16.9 | 19.3 | Bad |

As seen from the comparison between Examples 6 and 7, as compared with the pressure-sensitive adhesive sheet having the copolymerization composition including the monomer m1 (BA) and the monomer m3 (NVP), and not including the monomer m2 in the present invention (Example 7), according to the pressure-sensitive adhesive sheet having the copolymerization composition replacing a part of NVP with the monomer m2 (here, HEAA) (Example 6), the repelling resistance was clearly improved while other characteristics were equivalently maintained. As seen from the comparison between Examples 8 and 9, as compared with the pressure-sensitive adhesive sheet having the copolymerization composition including the monomer m1 (2EHA) and the monomer m3 (DEAA), and not including the monomer m2 in the present invention (Example 9), according to the pressure-sensitive adhesive sheet having the copolymerization composition replacing a part of DEAA with HEAA (Example 8), the repelling resistance and the holding power were clearly improved while the peeling strength was equivalently maintained. Further, all of the pressure-sensitive adhesive sheets of Examples 6 to 9 did not have corrosiveness on a metal surface.

Example 10

To a reaction vessel equipped with a cooling tube, a nitrogen gas inlet tube, a thermometer, and a stirrer were put 0.2 part of 2,2'-azobisisobutylonitrile (AIBN) as a polymerization initiator, 70 parts of 2EHA, 26 parts of NVP, and 4 parts of HEAA as the monomer components, and ethyl acetate as a solvent, followed by stirring at room temperature under a nitrogen gas atmosphere for 1 hour. Thereafter, the contents (a solution containing the entire amount of the monomer mixture) in the reaction vessel were heated to 60° C., and polymerized in a nitrogen gas stream for 5.5 hours. By this batch feed type of solution polymerization, a solution of the acrylic polymer was obtained.

To the obtained acrylic polymer solution was added a reaction product of trimethylolpropane and tolylene diisocyanate (a trade name "CORONATE L" manufactured by NIPPON POLYURETHANE INDUSTRY CO., LTD. was used) as an isocyanate-based crosslinking agent in an amount of 0.2 part based on 100 parts of the acrylic polymer (in terms of solids content, and the same shall apply hereinbelow). As such, a pressure-sensitive adhesive composition according to Example 10 was prepared.

Two sheets of the release liners (thickness: 38 μm) that had been release-treated by a silicone-based releasing agent were prepared on the surface of a polyethylene terephthalate (PET) film. The above-described adhesive composition was applied onto the release surface (the surface that had been treated with the releasing agent) of the first release liner with an applicator, dried at 130° C. for 3 minutes to form a pressure-sensitive adhesive layer having a thickness of 50 μm on the release liner. Then, the pressure-sensitive adhesive layer was combined with the release surface of the second release liner. As such, a pressure-sensitive adhesive sheet (a release liner-attached adhesive sheet) configured such that the both sides of the pressure-sensitive adhesive layer were protected with the release liners was prepared. The gel fraction of the pressure-sensitive adhesive as measured in the same manner as in Example 1 was 49.2%.

Example 11

A pressure-sensitive adhesive composition was prepared in the same manner as in Example 10, except that the monomer mixture of the composition shown in Table 3 (in the table, "HEA" represents hydroxyethyl acrylate) was used, and that the amount of the isocyanate-based crosslinking agent to be added based on 100 parts of the acrylic polymers was 0.1 part, and a pressure-sensitive adhesive sheet was prepared using the composition. The gel fraction of the pressure-sensitive adhesive was 59.4%.

Example 12

A pressure-sensitive adhesive composition was prepared in the same manner as in Example 10, except that the monomer mixture of the composition shown in Table 3 (in the table, CHMI" represents N-cyclohexylmaleimid) was used, and that the amount of the isocyanate-based crosslinking agent to be added based on 100 parts of the acrylic polymers was 0.5 part, and a pressure-sensitive adhesive sheet was prepared using the composition. The gel fraction of the pressure-sensitive adhesive was 53.4%.

The evaluation tests as described above were carried out on the pressure-sensitive adhesive sheets prepared in Examples 9 to 12 (which are provided with adhesive layers formed from the solvent-type adhesive compositions). The results are shown in Table 3.

TABLE 3

| | Monomer mixture (part) | | | | | | Repelling resistance (mm) | | Peeling strength | Holding |
| --- | --- | --- | --- | --- | --- | --- | --- | --- | --- | --- |
| | 2EHA | NVP | CHMI | HEAA | HEA | Corrosiveness | 4 hr | 7 hr | (N/25 mm) | power |
| Example 10 | 70 | 26 | | 4 | | Absence | 0.4 | 0.8 | 25.0 | Good |
| Example 11 | 70 | 26 | | | 4 | Absence | 1.5 | 2.9 | 23.5 | Good |
| Example 12 | 70 | 26 | 4 | | 1 | Absence | 3.1 | 7.3 | 20.6 | Good |

As shown in Table 3, according to the pressure-sensitive adhesive sheets having the copolymerization composition replacing HEA (Example 11) with an equivalent amount of HEAA (Example 10) in the monomer mixture, the repelling resistance was further improved (the total value of the floating heights was decreased) while maintaining other characteristics at least equivalently. Further, by the pressure-sensitive adhesive sheets having the copolymerization composition replacing CHMI (Example 12) with an equivalent amount of HEAA (Example 10) in the monomer mixture, an effect of improving the adhesive performances was seen similarly. Moreover, all of the pressure-sensitive adhesive sheets according to Examples 10 to 12 did not have corrosiveness on a metal surface, and showed sufficient holding power.

As shown above, specific examples of the present invention are described in detail, these are only for the illustrative purpose, and do not limit the scope of the claims. The technologies as described in the scope of the claims include various modifications and alterations of the specific examples as described above.

While the invention has been described in detail and with reference to specific embodiments thereof, it will be apparent to one skilled in the art that various changes and modifications can be made therein without departing from the spirit and scope thereof.

This application is based on Japanese Patent Applications (Patent Application No. 2008-135518 filed on May 23, 2008, and Patent Application No. 2008-198269 filed on Jul. 31, 2008), the entirety of which is incorporated herein by way of reference.

As described above, a pressure-sensitive adhesive sheet provided with a pressure-sensitive adhesive layer formed by using the pressure-sensitive adhesive composition of the present invention exhibits good adhesive performances (repelling resistance, static load characteristics, and the like) at a normal temperature, and further, it can be preferably used, for example, for affixation of an article having a metal surface, in addition to an electronic part, as a bonding material having a suppressed property of corroding a metal surface. The pressure-sensitive adhesive sheet can be preferably used for other applications in the embodiment for directly applying on a metal surface, for example, for the applications such as conveyance, protection, decoration, and the like of articles having a metal surface, making an advantage of such the characteristics. The pressure-sensitive adhesive composition of the present invention is suitable as a pressure-sensitive adhesive composition used for a pressure-sensitive adhesive sheet to be attached to a metal surface (typically for forming a pressure-sensitive adhesive layer of the pressure-sensitive adhesive sheet). Further, the pressure-sensitive adhesive sheet provided by the present invention can be suitably used in other application embodiments, without limitation to the embodiments for directly attaching on a metal surface, since it exhibits good adhesive performances at a normal temperature as described above.

What is claimed is:

1. A pressure-sensitive adhesive composition comprising, as a main ingredient, a monomer mixture or an acrylic copolymer material obtained by at least partially polymerizing the monomer mixture,
    said monomer mixture comprising:
    at least one monomer (monomer m1) selected from alkyl (meth)acrylates represented by the following formula (I) in an amount of 50 to 85% by weight based on a total amount of the monomer mixture:

$$CH_2C(R^1)COOR^2 \qquad (I)$$

wherein $R^1$ is a hydrogen atom or a methyl group, and $R^2$ is an alkyl group having 1 to 20 carbon atoms,
    N-(2-hydroxyethyl)acrylamide (monomer m2) in an amount of 2 to 12% by weight based on the total amount of the monomer mixture, and
    N-vinyl-2-pyrrolidone (monomer 3), in an amount of 10 to 40% by weight based on the total amount of the monomer mixture; and
    said monomer mixture comprising substantially no carboxyl group-containing monomer.

2. The composition according to claim 1, wherein the monomer m1, the monomer m2 and the monomer m3 are contained in a total amount of 90% by weight or more based on the total amount of the monomer mixture.

3. The composition according to claim 1, wherein the monomer mixture has such a monomer composition that the acrylic copolymer, obtained by polymerizing the monomer mixture, has a glass transition temperature (Tg) of −10° C. or lower.

4. The composition according to claim 1, which is used for a pressure-sensitive adhesive sheet to be directly attached to a metal surface.

5. A pressure-sensitive adhesive sheet comprising a pressure-sensitive adhesive layer formed by using the composition according to claim 1.

6. A method for producing a pressure-sensitive adhesive sheet, said method comprising:
    preparing a pressure-sensitive adhesive composition comprising a monomer mixture or an acrylic copolymer material obtained by partially polymerizing the monomer mixture, and 0.01 to 2 parts by weight of a photopolymerization initiator based on 100 parts by weight of the monomer mixture,
    said monomer mixture comprising:
    at least one monomer (monomer m1) selected from alkyl (meth)acrylates represented by the following formula (I) in an amount of 50 to 85% by weight based on the total amount of the monomer mixture:

$$CH_2=C(R^1)COOR^2 \qquad (I)$$

wherein $R^1$ is a hydrogen atom or a methyl group, and $R^2$ is an alkyl group having 1 to 20 carbon atoms,
    N-(2-hydroxyethyl)acrylamide (monomer m2) in an amount of 2 to 12% by weight based on the total amount of the monomer mixture, and
    N-vinyl-2-pyrrolidone (monomer 3), in an amount of 10 to 40% by weight based on the total amount of the monomer mixture, and
    said monomer mixture comprising substantially no carboxyl group-containing monomer;
    applying the pressure-sensitive adhesive composition to a support; and
    curing the applied composition by irradiating the applied composition with light to thereby form a pressure-sensitive adhesive layer.

* * * * *